3,245,959
CATALYTIC COPOLYESTERIFICATION
Gerald P. Roeser, Lahaska, Pa., assignor, by mesne assignments, to Socony Mobil Oil Company, Inc., New York, N.Y., a corporation of New York
No Drawing. Filed Apr. 4, 1962, Ser. No. 184,951
13 Claims. (Cl. 260—75)

The present application is a continuation-in-part of my prior copending application Serial No. 72,310 filed November 29, 1960, now abandoned.

The present invention relates to the direct esterification of iso- and terephthalic acids with aliphatic polyhydric alcohols, especially polyhydroxy-substituted saturated straight chain and branched chain hydrocarbons, and especially to the efficient production of polyesters and copolyesters from iso- and terephthalic acids, particularly copolyesters comprising aliphatic diol (typically ethylene glycol) and saturated aliphatic polyhydric alcohol having at least three hydroxyl groups (typically glycerin).

The polyesters and copolyesters which are the principal subject of the invention include many known polymers, but these are difficult to produce. Thus, the art has emphasized the need to employ lower alkyl diesters of the dicarboxylic acid, e.g., dimethyl terephthalate, because it did not have an acceptable method for the rapid direct esterification of terephthalic acid, especially in the absence of undesirable side reactions.

Iso- and terephthalic acids are difficult to esterify. The invention is based upon the discovery that certain catalysts are effective at reaction temperatures above about 160° C. to promote direct esterification of iso- and terephthalic acids, so that iso- and terephthalic acids can now be used directly and efficiently in the production of esters, polyesters and copolyesters. These catalysts are effective in amounts of from 0.01–5%, preferably from 0.1–2% based on the total weight of components subjected to esterification. While some transesterification may take place, the reaction of the invention is principally a direct esterification requiring removal of water of esterification.

In accordance with the invention, it has been found that four metals are uniquely effective to permit the direct catalytic esterification of iso- and terephthalic acids with aliphatic polyhydric alcohols at temperatures of at least about 160° C. when at least a trace of the metal is present in the reaction mixture to provide dissolved metal ion. These four uniquely effective metals are titanium, tin, antimony, and bismuth. Five other metals, namely, lithium, cobalt, nickel, tungsten and molybdenum, are moderately and valuably effective under the same conditions. However, these five metals are significantly less effective than titanium, tin, antimony and bismuth.

As will be understood from the above statement of the invention, the metal which is selected must be used in a form which will permit it to dissolve sufficiently under the conditions of reaction to provide the at least trace quantities of metal ion which are necessary. It is stressed that numerous compounds may be used in the invention so that selection of the specific agent which is used, while important, is not a primary feature of the invention. In some instances, the metal itself is sufficiently soluble to be used. For example, titanium metal and tin metal are sufficienty soube to be effective in accordance with the invention. In some instances, the oxides and hydroxides of the metal have the required solubility and are usable such as titanic acid, stannous oxide, bismuth hydroxide, and antimony trioxide. In other instances, it has been found that the oxide having the highest valence resists dissolution in the esterification medium to an extent as to be ineffective. In this category, titanium dioxide and stannic oxide are relatively ineffective. While the effectiveness of titanium dioxide and stannic oxide is somewhat improved by employing these compounds in extremely finely divided form, the improvement so-obtained is inadequate and titanium dioxide and stannic oxide, even in finely divided form, are relatively ineffective.

The presence of at least trace quantities of the selected metal ion in solution in the esterification medium is facilitated by the utilization of organic derivatives of the metal. Thus, organc derivatives of titanium are all effective in accordance with the invention, and these can be best illustrated by reference to titanium esters.

The titanium esters which are used in accordance with the invention fall within broad classes of known compounds. Some of these are known to be useful for transesterification, but not for the direct esterification of iso- and/or terephthalic acids. These titanium esters are organic esters of titanium in which at least one organic radical containing from 1 to 20 carbon atoms is joined to the titanium atom through an oxygen atom. The specific nature of the organic radical or radicals is of secondary significance, although organic radicals containing only carbon, hydrogen, and oxygen are preferred and hydrocarbon radicals are particularly preferred. The peferred catalysts which are used in accordance with the invention are selected from the group consisting of titanium tetralkoxides, acylates thereof with organic acids, especially fatty acids, chelates thereof with polyfunctional organic compounds, and quaternary salts thereof with ammonia, alkali metals and alkaline earth metals containing a complex titanium hexalkoxy radical. Partially hydrolyzed derivatives of these titanium esters are also effective. Indeed, it is possible that some partial hydrolysis of the catalyst selected will take place in situ since traces of water are inevitably present in the copolymerization system.

Titanium tetralkoxides have the formula Ti(OR)$_4$.

The acylates which may be used can be formed by reaction of the titanium tetralkoxide with a saturated or unsaturated organic acid. These acylates are not infrequently polymeric and have the following typical formula:

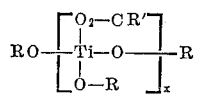

in which $x$ indicates the extent of polymerization which is not material to the invention.

Chelates can also be used, these being formed by reacting the titanium tetralkoxide with a polyfunctional organic compound such as octylene glycol, triethanol amine or 2,4-pentanedione. These chelates are illustrated by octylene glycol titanate, triethanol amine titanate and titanium pentanedionate, these having the following formulas:

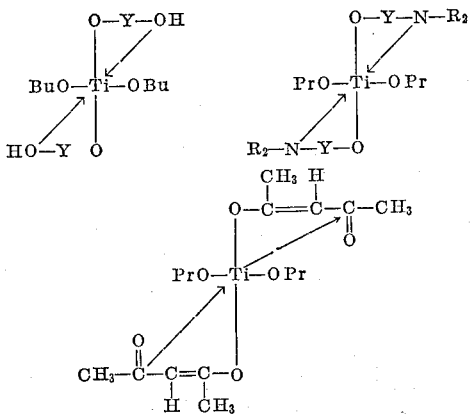

in which Y represents an organic residue, Bu is butyl, Pr is isopropyl and the arrows indicate a secondary bond formed by the acceptance of electrons from an atom capable of donating them such as oxygen or nitrogen.

The quaternary salts containing a complex titanium hexalkoxy radical can be of various types such as those having the following structural formulas: $(RR'R''R''')_2(Ti(OR)_6)$; $(RR'R''R''')H(Ti(OR)_6)$; $MH(Ti(OR)_6)$; $M_2(Ti(OR)_6)$; $M'(HTi(OR)_6)_2$; and $M'(Ti(OR)_6)$.

In all of the foregoing formulas, R, R′, R″ and R‴ each represents an organic radical containing from 1–20 carbon atoms, preferably a hydrocarbon radical, and most preferably an alkyl radical; M is an alkali metal, e.g., lithium, sodium or potassium; and M′ is an alkaline earth metal, such as Mg, Ca or Sr.

The preparation of the titanium tetralkoxides and complex titanium hexalkoxy ammonium salts is described in Caldwell and Wellman Patent 2,727,881. The preparation of the complex titanium hexalkoxide alkali metal and alkaline earth metal salts is described in Caldwell Patent 2,720,502. The preferred catalysts are titanium tetraisopropoxide, titanium tetrastearoxide, partially hydrolyzed titanium tetrastearoxide hydrolyzed to provide about 1 stearoxide group per titanium atom, and titanium tetrabutoxide. However, other titanium tetra-esters and partially hydrolyzed derivatives thereof falling within the group defined, such as titanium tetrahexoxide, titanium tetraethoxide and titanium tetramethoxide, may also be used. Unsaturated esters may also be used such as titanium tetrabutenyloxide. The useful quaternary ammonium salts are illustrated by tetramethyl ammonium titanium hexabutoxide, tetraethyl ammonium titanium hexaethoxide, trimethyl benzyl ammonium titanium hexabutoxide, di(trimethyl benzyl) ammonium titanium hexabutoxide, tetrapropyl ammonium titanium hexamethoxide and tetrapropyl ammonium titanium hexabutoxide. The useful alkali metal and alkaline earth metal salts are illustrated by:

$NaH(Ti(OC_4H_9)_6)$; $LiH(Ti(OC_2H_5)_6)$;
$K_2(Ti(OC_2H_5)_6)$; $Li_2(Ti(iso\ C_4H_9O)_6)$;
$KH(Ti(OCH_3)_6)$; $Na_2(Ti(OC_4H_9)_6)$;
$Na_2(Ti(OC_2H_5)_6)$; $Li_2(Ti(OC_4H_9)_6)$;
$Mg(Ti(OC_4H_9)_6)$; $Mg(HTi(OC_2H_5)_6)_2$;
$Ca(HTi(OC_2H_5)_6)_2$; $Sr(HTi(OC_4H_9)_6)_2$;
$Mg(HTi(OCH_3)_6)_2$; $Mg(HTi(OC_6H_{13})_6)_2$;
and $NaH(Ti(OC_2H_5)_6)$.

Useful titanium acylates are illustrated by isopropoxytitanium oleate, isopropoxytitanium stearate, isopropoxytitanium benzoate, and isopropoxytitanium soy acylate. The corresponding products produced by hydrolysis can also be used such as hydroxytitanium oleate.

While innumerable organic derivatives of titanium have been illustrated, the listing is by no means complete and corresponding organic salts or chelates of tin, antimony, bismuth, lithium, cobalt, nickel, tungsten and molybdenum are similarly useful in accordance with the invention. Still other organic derivatives which may be used are illustrated by polyalkyl derivatives of tin oxide such as dibutyl tin oxide and tributyl tin oxide as well as salts such as dibutyl tin diacetate.

As previously indicated, the invention is restricted to iso- and terephthalic acids, both of which are difficult to esterify and both of which respond in the same way to the catalytic esterification of the invention. While isophthalic acid is more soluble in the esterification medium, e.g., in the glycol or other saturated aliphatic polyhydric alcohol or mixture thereof which is used, than is terephthalic acid, both are poorly soluble at room temperature and both are poorly reactive, even when in solution. The invention is primarily directed to what may be termed a slurry esterification. In contrast, conventional esterification normally involves a solution system in which the carboxylic acid which is esterified is soluble to an appreciable extent in the hydroxyl compound used and is easily reactive in the solution system.

The invention should not be confused with transesterification. Transesterification catalysts are normally ineffective to strongly promote direct esterification. Moreover, most catalysts which are useful for direct esterification are operative at low temperatures of reaction, e.g., temperatures below 130° C. In contrast, the catalysts found to be effective in accordance with the invention are substantially wholly lacking in effectiveness for direct esterification until a threshold temperature of about 160° C. is reached. Above 160° C., the presence of traces of metal in solution in the solution or slurry esterification medium are unusually and surprisingly effective in promoting direct esterification.

To illustrate the difference between direct esterification and transesterification and the uniqueness of titanium esters to direct esterification in the invention, the transesterification reaction of ethyl benzoate with butanol to yield butyl benzoate and ethanol, shows that titanium, while effective for transesterification, is not outstandingly superior to other metals such as aluminum and sodium. Thus, 100% conversion using tetra isopropyl titanate takes approximately 0.7 hour. The same conversion takes approximately 0.8 hour using aluminum isopropoxide and approximately 1.2 hours using sodium ethylate. Thus, all of these metals are approximately comparable in effectiveness. In contrast, in the direct esterification of terephthalic acid with ethylene glycol to form diethylene glycol terephthalate, tetra isopropyl titanate as catalyst provides 100% conversion in 3 hours whereas aluminum isopropoxide provides only a 40% conversion after a 7 hour reaction period and sodium ethylate provides only an 89% conversion after 14 hours. Accordingly, while these catalysts are approximately comparable in transesterification, they are completely different in direct esterification, the aluminum and sodium compounds being so ineffective as not to be fairly comparable.

It should also be kept in mind that direct esterification, as known to the art, normally employs a strongly acidic substance. When these strongly acidic catalysts, such as p-toluene sulfonic acid, are employed for the production of polymers by polyesterification, polyether products tend to result and the desired polyesterification does not take place.

Thus, in accordance with the invention, any aliphatic polyhydric alcohol may be used. The preferred polyhydric alcohols are polyhydroxy-substituted saturated straight chain and branched chain hydrocarbons, illustrated by ethylene glycol; 1,4-butane diol; 1,3-propane diol; trimethylol ethane; cyclohexane dimethanol; glycerin; neopentyl glycol and pentaerythritol. As will be appreciated, these polyhydric alcohols are merely illustrative and any of these may be selected for reaction with iso- and terephthalic acids, alone or in admixture with one another, to produce diester monomers or polyesters of any desired molecular weight, or the polyhydric alcohols may be used in combination to form copolyesters.

The present invention is especially directed to the production of copolyesters containing three essential components. The first component is selected from the group of isophthalic acid, terephthalic acid and mixtures thereof. The invention is of particular importance with respect to terephthalic acid because this acid produces polyesters having the best properties and because this acid is the most difficult to esterify in the absence of the catalysts of the invention.

The second essential component of the copolyester is aliphatic diol containing from 2–10 carbon atoms. Various aliphatic hydrocarbon diols may be used, including cycloaliphatic diols, the preferred diol being ethylene glycol. Diethylene glycol; 1,4-butanediol; 1,5-pentanediol; and 1,4-butene-2-diol illustrate other preferred diols for use alone or together with ethylene glycol. Other diols which may be used are illustrated by 1,2-propanediol; 1,3-propanediol; 1,6-hexanediol; 1,3-cyclobutane diol; 1,4-cyclohexane diol; 1,4-cyclohexane dimethanol, etc. The preferred straight chain diols are those having from 2–5 carbon atoms and two primary hydroxyl groups. 1,4-cyclohexanone dimethanol is a preferred cyclic diol.

The last essential component of the copolyester is a polyhydric alcohol having at least three hydroxyl groups, such as glycerin; pentaerythritol; 1,1,1-trimethylolethane; 1,1,1-trimethylolpropane; sorbitol; mannitol; dipentaerythritol; diglycerol, etc. Glycerin is typical of the various polyols which may be used and is preferred on the basis of cost and availability.

The copolyester includes, in accordance with the invention, at least 10% by weight of each of the three essential components referred to hereinbefore. Preferably, the copolyester consists essentially of (a) from about 25 to 56 equivalent percent of dicarboxylic acid selected from the group of isophthalic acid, terephthalic acid and mixtures thereof, (b) from about 15 to 46 equivalent percent of aliphatic diol having from 2–10 carbon atoms, and (c) from about 13 to 44 equivalent percent of a saturated aliphatic polyhydric alcohol having at least three hydroxyl groups.

The term "equivalent percent" designates the percentages computed for each reactant in accordance with the formula:

Equivalent percent of Reactant =

$$\frac{100 \times \text{Equivalents of reactant}}{\text{total equivalents}}$$

in which the number of equivalents of any reactant is the number of moles of the reactant multiplied by the number of functional groups present in the reactant, e.g., 2 for phthalic acid, 2 for ethylene glycol and 3 for glycerin.

The polyesterification reaction, in accordance with the invention, is effected by simply heating the three essential components in admixture with one another in the presence of an appropriate proportion of the selected catalyst, the reaction temperature being maintained at a temperature in the range of from 160–250° C., preferably in the range of from 190–245° C. The minimum temperature is required to obtain, in the presence of the selected catalyst, the essential esterification reaction. The maximum temperature is an approximation of secondary significance to eliminate foaming which occurs on overheating. The reaction proceeds easily and smoothly and the rate of reaction is primarily governed by the capacity of the equipment selected to remove the water which results from the direct esterification. This water is conveniently removed by fractional distillation. It is interesting to observe at this point, that transesterification is not accompanied by the production of water which is, instead, a characteristic of direct esterification.

All of the three essential copolyester components may be mixed together, as above indicated, or it is also convenient to pre-react all or a portion of the hydroxy-containing reactants with acid. The preferred procedure involves a single stage reaction, for this leads to manufacturing simplicity. In a single stage reaction there is a tendency for the polyhydric alcohol component to lead to premature gelation, but this is only of importance when one desires to produce a product of maximum molecular weight and minimum acid number. Nevertheless, the single stage reaction can be satisfactorily operated to provide high molecular weight and low acid number by employing a small excess of polyhydric alcohol and/or aliphatic diol, e.g., 10% excess of each, based on the proportion of these components desired in the final product. Occasionally, and as is illustrated when using glycerin, there is some tendency for a portion of the glycerin to be boiled out of the system and lost. In such instances, it is desirable, but not essential, to tie-up the glycerin by pre-reaction with dicarboxylic acid in the presence of the selected catalyst, preferably by using a mole ratio of glycerin to acid in excess of 1.5:1, and desirably in a mole ratio of substantially 2:1 so as to form diglycerol phthalate. This diglycerol phthalate intermediate is then reacted with additional acid and aliphatic diol, desirably in the presence of a further proportion of the selected catalyst and the reaction temperature is again maintained above 160° C. to form the desired high molecular weight copolyester. In this two-stage reaction, a small proportion of excess glycol is desirably employed, but this is not essential. A preferred proportion of excess glycol is illustrated by an excess of 10%, based on the proportion of glycol which it is desired to incorporate in the completed copolyester.

The two-stage reaction described above is of assistance in reducing glycerin losses and it facilitates the achievement of highest molecular weight. Nevertheless, the glycerin losses are small and can be tolerated since, with sufficient care in operation, substantially the same high molecular weight and low acid number can be obtained in a one-stage reaction.

While reference has been made to the formation of a glycerol intermediate with acid, it will be understood that one can also form a corresponding glycol intermediate with acid.

The copolyesterification reaction mixture is held at the reaction temperature until the reaction has been completed. As will be obvious from the presence of trifunctional glycerin or other polyhydric alcohol in the copolyester which is formed, it is important to stop the reaction at an appropriate point where molecular weight has been built up to the desired extent, but before the copolyester tends to gel. Completion of the reaction can be observed in various ways. One procedure which may be employed is to measure the proportion of water which is removed, it being understood that using this technique requires that the amount of water held up in the fractional distillation column must be estimated. Completion of the reaction can also be observed by testing a cooled sample of the product in solution in a suitable solvent medium to observe its molecular weight as evidenced by its relative viscosity. Acid number or melting point of the product can also be obtained and used as a guide to indicate completion of the reaction.

When experience is gained by operation, the end of the reaction may be easily observed and the reaction terminated when the pot temperature has increased to a predetermined temperature or when the batch viscosity at reaction temperature has increased to the desired extent.

The reaction proceeds well at atmospheric pressure. Although vacuum can be used, it is not needed. The reaction proceeds as rapidly as water of esterification is removed from the system which is governed by the size and efficiency of the fractionating column which is used.

Preferably, the fractionating column is selected to possess minimum back-pressure, especially at the end of the reaction, to assist in avoiding excessively high reaction temperatures which lead to foaming. Sparging with an inert gas, such as nitrogen, is also helpful to speed the reaction and, because of this, the use of sparging or the rate of sparging may be used to control the progress of the reaction.

While the use of fractional distillation to remove the water of esterification is preferred, the invention is not limited to any specific technique of water removal. A further technique for water removal which may be used is illustrated by the use of a water insoluble solvent, such as xylene, to permit azeotropic removal of water.

It is desired to point out that the production of monomeric esters, especially diglycol and diglycerol esters of iso- and terephthalic acids, constitutes a feature of the invention. While it is important in the preferred commercial production of copolyesters to conduct the reaction in the presence of the phthalic acid so that the polyesterification process will include direct esterification, this is not an essential feature of the invention. Thus, once monomeric esters have been produced, it is feasible to effect polyesterification or copolyesterification by a transesterification reaction.

To illustrate the importance of the invention, the direct esterification of ethylene glycol or glycerin as typical hydroxyl-containing compounds with terephthalic acid does not proceed in a rapid and efficient manner in the absence of catalyst. Using isophthalic acid in place of terephthalic acid, the reaction does proceed, but it is still slow and ineffective. In the presence of conventional esterification catalysts, such as p-toluene sulfonic acid, there appears to be a strong tendency for etherification to take place and monomeric esters are not efficiently produced. As a point of interest, it is known that p,p'-sulfonyl dibenzoic acid can be condensed with hydroxyl-containing compounds in the absence of catalyst, but the sulfonyl group appears to provide some catalytic function which is not possessed by iso- and terephthalic acids.

The catalysts selected in accordance with the invention are effective when used in very small amounts to provide an extremely rapid direct esterification reaction. More specifically, and in the presence of 1% by weight of catalyst, based on the weight of components subjected to polyesterification, and at a temperature of 200° C., with water of esterification being removed by fractionation through a stainless steel packed column, 2 moles of ethylene glycol can be reacted with 1 mole of terephthalic acid in from 3 to 5 hours. In contrast, other metals, their oxides and organic derivatives, require about 7–10 hours to be effective whereas, the reaction in the absence of catalyst, requires about 13 hours. Since the extent of polymer degradation is a function of time, the importance of a fast reaction is easily apparent, especially at the high temperatures under consideration.

The surprising results achieved in accordance with the invention are illustrated in Table I which shows the results obtained using a defined proportion of several identified catalysts to speed the reaction of 2 moles of ethylene glycol with 1 mole of terephthalic acid. The reaction mixture is heated rapidly to 200° C. and maintained at this temperature while the water of esterification is removed by fractionation for the time indicated.

TABLE I

| Catalyst | | Ethylene Glycol Terephthalate | |
|---|---|---|---|
| Percent by Weight (Based on Weight of Reactants) | Type | Hours at 200° C. | Percent Conversion |
| 1.0 | Titanium Metal Powder (325 mesh) | 4 | 100 |
| 1.0 | Isopropyl Titanate | 3 | 100 |
| 0.03 | Isopropyl Titanate | 7 | 100 |
| 3.95 | Stearyl Titanate | 5 | 100 |
| 1.0 | Hydroxymonostearyl Titanate Polymer | 5 | 100 |
| 1.0 | Titanium Chloride Acetylacetonate | 4 | 100 |
| 1.0 | Reaction product of 1 mole trimethyl-benzyl ammonium hydroxide with 1 mole isopropyl titanate. | 5 | 100 |
| 1.0 | Reaction product of 1 mole sodium methylate with 1 mole isopropyl titanate. | 4 | 100 |
| 1.0 | Reaction product of 2 moles sodium methylate with 1 mole isopropyl titantate. | 5 | 100 |
| 1.0 | Tin Metal Powder (325 mesh) | 4 | 100 |
| 1.0 | Stannous Oxide | 5 | 100 |
| 1.0 | Tin Oxalate | 4 | 100 |
| 1.0 | Dibutyl Tin Oxide | 5 | 100 |
| 1.0 | Tributyl Tin Oxide | 6 | 100 |
| 1.0 | Dibutyl Tin Diacetate | 4 | 100 |
| 1.0 | Antimony Oxide ($Sb_2O_3$) | 5 | 100 |
| 1.0 | Bismuth Hydroxide | 5 | 100 |
| 1.0 | Lithium Acetate | 7 | 100 |
| 1.0 | Cobalt Octoate | 7 | 100 |
| 1.0 | Nickel Acetylacetonate | 7 | 100 |
| 1.0 | Molybdenum Trioxide | 7 | 100 |
| 1.0 | Tungstic Acid | 7 | 100 |

In contrast, in the absence of the invention or using excessively insoluble compounds leads to the results reported in Table II.

TABLE II

| Catalyst | | Ethylene Glycol Terephthalate | |
|---|---|---|---|
| Percent by Weight (Based on Weight of Reactants) | Type | Hours at 200° C. | Percent Conversion |
| | None | 13 | 100 |
| 1.0 | Rutile $TiO_2$ (pigment grade) 0.3–0.4 micron | 14 | 100 |
| 1.0 | Anatase $TiO_2$ (pigment grade) 0.3–0.4 micron | 15 | 100 |
| 1.0 | Titanium Dioxide (finely divided) 0.03–0.04 micron. | 9 | 100 |
| 1.0 | Stannic Oxide | 5 | 0 |

The metals which are effective for direct esterification in accordance with the invention are dispersed throughout the Periodic Table, appearing in Groups I–A, IV–B, VI–B, VIII, IV–A and V–A. Other metals of these same groups as well as metals of other groups are not effective catalysts in accordance with the invention as is established in Table III which follows:

TABLE III

| Catalyst | | Ethylene Glycol Terephthalate | |
|---|---|---|---|
| Percent by Weight (Based on Weight of Reactants) | Type | Hours at 200° C. | Percent Conversion |
| | None | 13 | 100 |
| 1.0 | Diphenyl Tin Oxide | 14 | 100 |
| 1.0 | Ethyl Silicate | 6 | 5 |
| 1.0 | Ethyl Triethoxysilane | 14 | 92 |
| 1.0 | Aluminum Isopropoxide | 7 | 40 |
| 1.0 | Sodium Methoxide | 14 | 89 |
| 1.0 | Manganese Octoate | 10 | 100 |
| 1.0 | Cerium Octoate | 7 | 42 |
| 1.0 | Iron Octoate | 10 | 15 |
| 1.0 | Potassium Octoate | 8 | 90 |
| 1.0 | Lead Octoate | 12 | 100 |
| 1.0 | Calcium Octoate | 11 | 100 |
| 1.0 | Zinc Octoate | 12 | 100 |
| 1.0 | Zirconium Acetylacetonate | 13 | 100 |
| 1.0 | Chromium Acetylacetonate | 10 | 100 |
| 1.0 | Beryllium Acetylacetonate | 13 | 100 |
| 1.0 | Thorium Acetylacetonate | 12 | 100 |
| 1.0 | Vanadium Acetylacetonate | 13 | 100 |
| 1.0 | Litharge | 10 | 100 |
| 1.0 | Cuprous Oxide | 10 | 100 |
| 1.0 | Cupric Oxide | 7 | 87 |
| 1.0 | Cadmium Oxide | 14 | 100 |
| 1.0 | Mercuric Oxide | 12 | 100 |
| 1.0 | Magnesium Oxide | 15 | 100 |

The invention is further illustrated in the following examples:

*Example 1*

0.77 mole of ethylene glycol, 0.33 mole of glycerin and 1.0 mole of terephthalic acid are mixed in a 3-necked reaction vessel equipped with a stirrer, thermometer and a 12-inch fractional column adapted to permit water to be distilled off while returning any volatilized glycol and glycerin to the vessel. Titanium tetraisopropoxide is added to the mixture in an amount of 0.25 weight percent and the mixture is then heated, with stirring to 195° C. With continued heating, the pot temperature gradually rises until, at the end of from 4–8 hours, the pot temperature reaches 250° C. and the acid number of the copolyester product is reduced to 20. At this point, the product is removed from the reaction vessel and cooled. The yield of copolyester is substantially quantitative and the final product possesses a relative viscosity measured in a solution of 1 gram of copolyester dissolved in 1 deciliter of 60/40 phenol/tetrachlorethane solvent at 77° F. of 1.25–1.30. Relative viscosity is defined as the ratio of the efflux time of a polymer solution to the efflux time of the pure solvent and measurements were made in a size 200 Ostwald-Kannon-Fenske viscometer.

When the present example is repeated using 1.0 weight percent of titanium tetraisopropoxide or 1.0 weight percent of tin metal powder (325 mesh); stannous oxide; tin oxalate; dibutyl tin oxide; tributyl tin oxide; dibutyl tin diacetate; antimony oxide ($Sb_2O_3$); bismuth hydroxide; lithium acetate; cobalt octoate; nickel acetylacetonate; molybdenum trioxide; or tungstic acid, essentially the same results are obtained, the only difference being relatively minor differences in the time required to obtain a copolyester acid number of 20.

As a point of interest, copolyesters having a relative viscosity in excess of 1.18 are valuable in coating solutions, including wire coating solutions. The copolyesterification procedure of the invention has been used to provide copolyesters having a relative viscosity of up to about 1.55 and higher values of relative viscosity are also contemplated.

*Example 2*

0.3 mole of glycerin, 0.15 mole of terephthalic acid and 0.25 percent of titanium tetraisopropoxide (0.13 gram) are charged to the 3-necked reaction vessel referred to in Example 1 and heat is applied to raise the temperature to 211° C. in 45 minutes. In 4.75 hours, the temperature rises to 244° C. and 5.9 grams of water are removed by distillation. The end of the reaction is indicated by complete dissolution of the acid to provide a clear product. The product is a heavy balsamic resin intermediate of acid number 6.7 and the yield is substantially quantitative.

The resin intermediate in an amount of 47.1 grams (0.15 mole of diglycerol terephthalate), 0.77 mole of ethylene glycol and 0.85 mole of terephthalic acid are charged to the 3-necked reaction vessel referred to and the mixture is heated to about 100° C. to facilitate ease of handling. When this occurs, 0.59 gram (0.25% by weight) of titanium tetraisopropoxide is added. Heating is continued with fractional distillation removal of water of esterification until the pot temperature reaches 250° C. at the end of about 5 hours. The fractionating column is then removed and straight over distillation is begun and continued for an hour until the product gains viscosity to provide a viscous, pale-colored resin which is poured into pans to cool. Conversion to copolyester resin is substantially quantitative.

In a plurality of runs following this example, satisfactory copolyesters for use in wire coating were produced, these having a relative viscosity of from 1.18–1.42.

Examples 1 and 2 can be repeated using a corresponding molecular proportion of isophthalic acid in place of the terephthalic acid component which is used in these examples. Essentially the same results are obtained. Moreover, Examples 1 and 2 can also be followed to produce satisfactory results irrespective of the aliphatic diol which is selected, or the polyhydric alcohol which is selected. It will be understood that Examples 1 and 2 illustrate preferred proportions of components. Thus, when tetrafunctional or higher functional polyhydric alcohols are employed, it would be preferred to substitute these for the glycerin of Examples 1 and 2 on an equivalent basis. Nevertheless, the proportions which are used in the invention are in no way limited by the preferred proportions which are illustrated in the examples. It will still further be understood that any of the titanium compounds or their partially hydrolyzed derivatives may be substituted in Examples 1 and 2 and effective results obtained. Some of these catalysts are more effective than others from the standpoint of the speed of the reaction.

Nevertheless, they are all effective and the principal factor governing reaction speed is the effectiveness of the removal of water of esterification. Similarly, any of the catalysts specified in Table I may be effectively employed as the catalyst in Examples 1 and 2.

It has previously been indicated than an appropriate maximum temperature using ethylene glycol and glycerin is about 250° C., the reason for this being the occurrence of foaming at higher temperatures. It will be appreciated that higher temperatures may be usefully employed when other aliphatic diols and polyhydric alcohols are selected for the reaction and that the occurrence of undesirable foaming is also a function of the pressure employed in the reaction. For these reasons, the secondary significance of the maximum reaction temperature will be appreciated, the only point of importance being reaction in the liquid phase and the effective removal of water of esterification.

The invention is defined in the claims which follow.

I claim:

1. A method of producing a resinous copolyester of reactants comprising (a) from about 25 to 56 equivalent percent of dicarboxylic acid selected from the group consisting of isophthalic acid, terephthalic acid and mixtures thereof, (b) from about 15 to 46 equivalent percent of aliphatic diol having from 2–10 carbon atoms, and (c) from about 13 to 44 equivalent percent of a saturated aliphatic polyhydric alcohol having at least three hydroxyl groups, comprising polyesterifying all of said component (c) with a portion of said component (a), said component (c) being in excess of at least 1.5:1 with respect to said portion of component (a), admixing the product so-obtained with the balance of said component (a) and with said component (b) and maintaining said mixture at a temperature of at least about 160° C. in the presence of at least a trace of metal ion dissolved therein and selected from the group consisting of ions of titanium, tin, antimony and bismuth, and removing water of esterification from the reaction mixture as esterification proceeds to produce said resinous copolyester.

2. A method as recited in claim 1 in which said aliphatic polyhydric alcohol is a polyhydroxy-substituted saturated hydrocarbon selected from the group consisting of straight chain and branched chain hydrocarbons.

3. A method as recited in claim 1 in which said acid consists essentially of terephthalic acid.

4. A method as recited in claim 1 in which said dissolved metal ion is supplied by the presence of from 0.01–5%, based on the total weight of said components (a), (b), and (c), of a titanium ester.

5. A method as recited in claim 1 in which said dissolved metal ion is supplied by the presence of from 0.01–5%, based on the total weight of said components (a), (b), and (c), of tin.

6. A method as recited in claim 1 in which said dissolved metal ion is supplied by the presence of from 0.01–5%, based on the total weight of said components (a), (b), and (c), of a polyalkyl tin oxide.

7. A method as recited in claim 1 in which said dissolved metal ion is supplied by the presence of from 0.01–5%, based on the total weight of said components (a), (b), and (c), of antimony trioxide.

8. A method as recited in claim 1 in which said polyhydric alcohol is glycerin.

9. A method as recited in claim 1 in which said aliphatic diol is ethylene glycol.

10. A method as recited in claim 1 in which said aliphatic diol contains from 2–5 carbon atoms and two primary hydroxyl groups.

11. A method as recited in claim 1 in which said copolyester is a copolyester of reactants consisting essentially of terephtalic acid, ethylene glycol and glycerin.

12. A method as recited in claim 1 in which said metal ion is a titanium ion.

13. A method as recited in claim 1 in which said metal ion is an antimony ion.

References Cited by the Examiner

UNITED STATES PATENTS

| | | | |
|---|---|---|---|
| 2,727,881 | 12/1955 | Caldwell et al. | 260—75 |
| 2,917,414 | 12/1959 | McLean | 260—75 |
| 2,936,296 | 5/1960 | Precopio et al. | 260—75 |
| 2,937,160 | 5/1960 | Sullivan | 260—75 |
| 2,956,985 | 10/1960 | Scruggs et al. | 260—75 |
| 3,050,548 | 8/1962 | Munro et al. | 260—75 |
| 3,053,883 | 9/1962 | Dean et al. | 260—410.6 |
| 3,055,867 | 9/1962 | Le Bras et al. | 260—75 |
| 3,056,818 | 10/1962 | Werber | 260—75 |
| 3,057,824 | 10/1962 | Le Bras et al. | 260—75 |
| 3,066,108 | 11/1962 | Broadhead | 260—75 |

FOREIGN PATENTS 835,743  5/1960  Great Britain.

OTHER REFERENCES

Groggins, Unig Processes in Organic Synthesis, pages 609, 618, McGraw Hill, 1952.

WILLIAM SHORT, *Primary Examiner.*

LEON BERCOVITZ, LOUISE QUAST, *Examiners.*